(12) United States Patent
Gibbs et al.

(10) Patent No.: US 6,775,945 B2
(45) Date of Patent: Aug. 17, 2004

(54) LURE WITH TASSEL TAIL

(75) Inventors: Louie W. Gibbs, Clermont, FL (US); James E. Tyner, Mascotte, FL (US)

(73) Assignee: Classic Fishing Products, Inc., Clermont, FL (US)

( * ) Notice: Subject to any disclaimer, the term of this patent is extended or adjusted under 35 U.S.C. 154(b) by 93 days.

(21) Appl. No.: 09/855,338

(22) Filed: May 16, 2001

(65) Prior Publication Data

US 2002/0170225 A1 Nov. 21, 2002

(51) Int. Cl.⁷ .............................................. A01K 85/00
(52) U.S. Cl. ................................................... 43/42.28
(58) Field of Search .......................... 43/42.28, 42.26, 43/42.27, 42.34, 42.24

(56) References Cited

U.S. PATENT DOCUMENTS

| | | | |
|---|---|---|---|
| 4,138,792 A | | 2/1979 | Hill |
| 4,215,506 A | | 8/1980 | LeBoeuf |
| 4,316,343 A | * | 2/1982 | Creme ........................ 43/42.26 |
| 4,619,069 A | * | 10/1986 | Strickland ................... 43/42.26 |
| 4,790,100 A | * | 12/1988 | Green, Sr. .................. 43/42.24 |
| 4,831,764 A | * | 5/1989 | Jecevicus .................... 43/42.25 |
| 4,969,811 A | | 11/1990 | Littleton |
| 5,428,918 A | * | 7/1995 | Garrison ..................... 43/42.24 |
| 5,465,523 A | | 11/1995 | Garst |
| 6,170,190 B1 | | 1/2001 | Wilson |
| 6,173,523 B1 | * | 1/2001 | Johnson ...................... 43/42.24 |
| 6,237,275 B1 | * | 5/2001 | Chambers, Sr. ............. 43/42.29 |
| 6,363,651 B1 | * | 4/2002 | Garst ......................... 43/42.24 |

\* cited by examiner

*Primary Examiner*—Charles T. Jordan
*Assistant Examiner*—Susan C. Alimenti
(74) *Attorney, Agent, or Firm*—Julian C. Renfro, Esq.

(57) ABSTRACT

An artificial fishing lure of resilient material having a body portion and a flexible, elongate tail. The tail possesses a curved configuration, being attached to the aft end of the body portion. The tail is thin and essentially flat when the tail is in a curved configuration, but it assumes a relatively straight configuration when the lure is moved through the water. A plurality of tassels are affixed in a spaced relationship along a long edge of the tail, with the tassels being relatively flexible and adapted to move with the tail at the time the tail undertakes a highly desirable undulating motion. The tassels cause the tail to give off vibrations attractive to fish. This lure is ideal for use when fishing for Large Mouth and Small Mouth Bass, but it is also quite suitable for use with species such as Stripe Bass and Wall Eye.

10 Claims, 2 Drawing Sheets

LURE WITH TASSEL TAIL

FIELD OF THE INVENTION

This invention relates to the creation of fishing lures, and more particularly to the creation of a novel tasseled fishing lure designed to provide vibratory motion particularly attractive to fish.

BACKGROUND OF THE INVENTION

Because of their large numbers and ease in harvesting, fish not only constitute an important food source for mankind, but also provide an important sport. Recreation fishing is enjoyed throughout the world, and artificial lures and bait have become an important tool in the arsenal of the angler.

In the past, lures have been constructed of many different materials, such as of silk, skin, feathers, wood, metals and the like. With the advent of easily formed plastics, it has been relatively easy to fashion lures to imitate bait such as shrimp, frogs, insects, fish, worms and the like. One of the latest trends in lure construction is to provide forms which more closely resemble live creatures that arouse the curiosity and rapacity of the fish.

Many of these plastic lures are characterized by long, thin ribbon tails that are curved or shaped to present wiggling or undulating simulated swimming action in the water in order to further attract fish to the lure. A variety of tail shapes, sizes, and thicknesses are currently used in many of the plastic fishing lures on the market today. Typical of the plastic fishing lures used with good success in catching black bass, small mouth bass, and other game fish is the "curly tail" lure having one or more tail segments extending therefrom and curled inwardly or outwardly to a thin ribbon-like point. When the lure is put into the water, the tail undulates or folds and unfolds as it "swims" through the water to attract fish. As described in the Garst U.S. Pat. No. 5,465,523 entitled "Undulating Single Tail Fishing Lure," lures of this type are shaped from a plastic material that can be easily injection molded in a variety of colors and shapes. Desirable odors can even be synthesized and provided in the lure bodies. Other lures, similar in form, are characterized by a "moving ribbon" appearance as they are drawn through the water.

It is to be noted from the Garst patent that this patentee provides a lure of U-shaped configuration which tends to straighten as it is drawn through the water, but concerning which this patentee says nothing about the fin of his lure undertaking a desired rippling on such occasion. Patentee Garst describes that his lure has a generally triangular cross section with a tall apex and a short base, with the sides of the lure slightly curved in a concave manner. Obviously Garst does not teach a lure having a so-called swimming tail equipped with a plurality of tassels to amplify the motion of the lure and to enhance the attractiveness of the lure to fish.

The Hill U.S. Pat. No. 4,138,792 entitled "Artificial Snake-Eel Body" describes a lure involving an elongate strip member of multi-convolution spiral configuration, which decreases in radius of curvature toward the rear end thereof. The strip is of greater transverse width than thickness and one longitudinal edge of the strip comprises the inner periphery of the spiral and the other longitudinal edge of the strip comprises the outer periphery of the spiral. This patentee sets forth that the strip is constructed of resilient, flexible material and includes, on its large radius of curvature end, an endwise outwardly projecting terminal end portion extending generally axially of the spiral of the strip and intended to simulate the head of a swimming snake or eel. The strip, when moved forwardly through the water, is stated to undulate in the manner of a swimming snake or eel and the patentee states that the "swimming action" thereof is difficult to distinguish from the undulating swimming movement of a snake or eel.

It is most important to note that patentee Hill states in the mid portion of Column 1 of his patent that his elongated strip is constructed of shape retentive flexible material.

It is to be noted that neither patentee Garst nor patentee Hill describe the specific configuration of the molds used in the creation of their lures, nor do they explain the particular circumstances under which molding efforts take place.

The Littleton U.S. Pat. No. 4,969,811 entitled "Apparatus for Making Plastic Devices" reveals that it is known to mold plastic fishing lures from suitable plastic utilizing various types of molds. The Littleton patent is concerned with the molding of lures having skirts of stranded plastic, such as shown in his FIG. 14. The Littleton patent reveals the use of mold cavities involving male and female mold components that cooperate in such a manner that a number of lures having stranded skirts can be molded at one time by the use of a suitable plastic heated to a proper molding temperature.

It was in an effort to improve upon these teachings of the prior art, and to increase the attractiveness of the lure to fish as the lure moves through the water, that the present novel tassel tail lure was evolved.

SUMMARY OF THE INVENTION

An artificial fishing lure in accordance with this invention is ideal when fishing for Black Bass, commonly called Large Mouth Bass. However, it is also quite suitable for use with other species, including Small Mouth Bass, Stripe Bass and Wall Eye.

Our lure is created in an initially curved configuration, with the lure being of resilient, flexible plastic material such that when attached to a line and pulled through the water, the lure essentially duplicates the swimming motion of a worm, eel, snake, or lizard. This novel lure has a body portion and a flexible, elongate, relatively thin tail of curved configuration, with a number of tassels utilized in a spaced relationship along the tail.

Our lure is usually made of a plastic such that it would float on the surface of a lake or other body of water. Therefore it is typical to use our lure in conjunction with a slip sinker or bullet weight.

Significantly, the relatively thin tail of our novel lure is essentially flat when the lure is in a curved configuration, but the tail advantageously undertakes a highly desirable rippled configuration when the tail has somewhat straightened out as a result of the lure being pulled through the water.

It is to be noted that the preformed fins or tails on certain lures of the prior art do not freely move back and forth in a realistic "swimming" motion.

As will be seen in greater detail hereinafter, our novel lure has a body portion and a flexible, elongate tail, with the tail possessing a curved configuration, being attached to the aft end of the body portion. When the lure is caused to move through the water, the tail advantageously undertakes undulating motion particularly attractive to fish.

Importantly to our invention, we attach a plurality of tassels in a spaced relationship along one of the long edges of the tail, with these novel tassels being relatively flexible and adapted to move with the tail at the time the tail undertakes the aforementioned undulating motion.

The tassels are preferably spaced along the curved outer peripheral edge of the tail and adapt readily to movement through the water. Because of this, the instant lure closely resembles the swimming action of a worm, eel, snake, tadpole or the like, even at very low speeds.

The tassels are sufficiently flexible as to undertake motion attractive to fish even when the lure is resting on the bottom. Even when the lure is not being pulled through the water, the tassels are caused to undertake movement by the natural currents in the water.

A principal object of this invention is to provide a lure able to be manufactured at low cost, which has a novel tail provided with a plurality of tassels enabling the lure, even at low speed, to very realistically duplicate the swimming movements of a worm, snake, eel or other aquatic animal which swims in a wriggling manner.

It is another object of this invention to provide a lure whose tail is molded in a curved configuration, with the tail of the lure being initially flat and equipped with a plurality of relatively small tassels, with the tail being caused as the result of motion of the lure through the water to extend rearwardly and in doing so to undertake a distinct rippling action highly attractive to a fish.

It is yet another object of our invention to provide a lure utilizing novel tassels that will remain active as a result of natural currents in the water, even when the lure is lying on the bottom of a lake, river or pond, with the motion of the tassels serving at such time as a continuing attraction for fish.

It is still another object of our invention to provide tassels spaced along the flexible tail of a lure, with such tassels serving to create vibrations and water movement that fish find particularly attractive.

It is yet still another object of our invention to provide a lure having a tail along which a series of tassels are deployed, with the tassels being of graduated length, with the tassels near the tail end of the lure being shorter than the tassels near the body of the lure.

These and other objects, features and advantages will become more apparent as the description proceeds.

DETAILED DESCRIPTION

Figure 1:
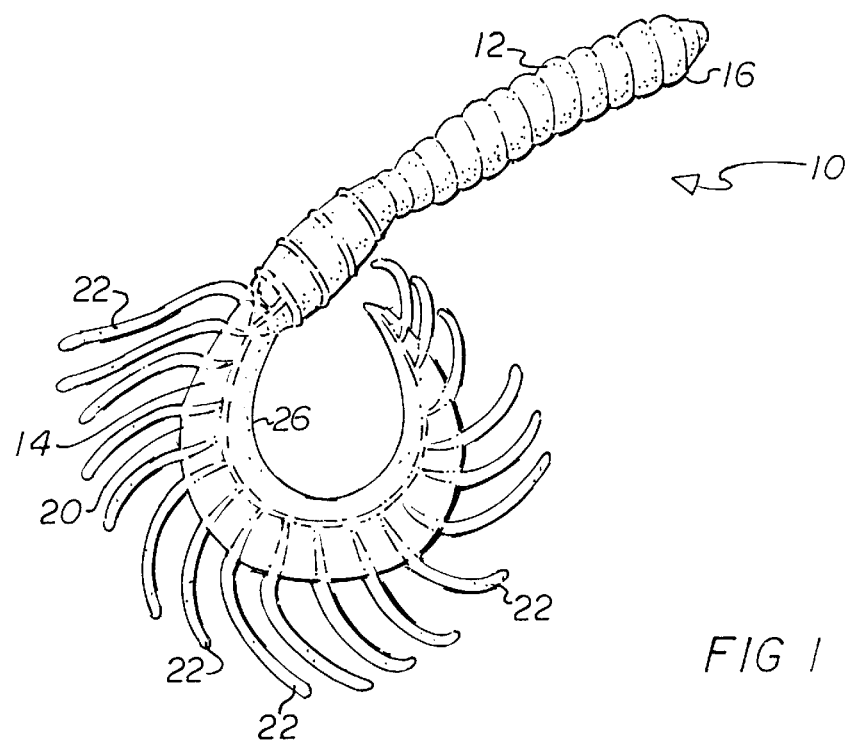
FIG. 1 is a plan view depicting the appearance of a typical tassel tail lure in accordance with this invention, with this figure depicting the approximate curved configuration of the tail of the lure at the time the lure is removed from the mold.

With initial reference to FIG. 1 it will be seen that we have illustrated in accordance with our invention, an exemplary embodiment of an artificial fishing lure 10 made of flexible plastic. The lure 10 in this instance involves a worm having a body portion 12 and a thin, flexible, elongate tail 14 commencing at the aft end of the body portion 12.

Figure 2:
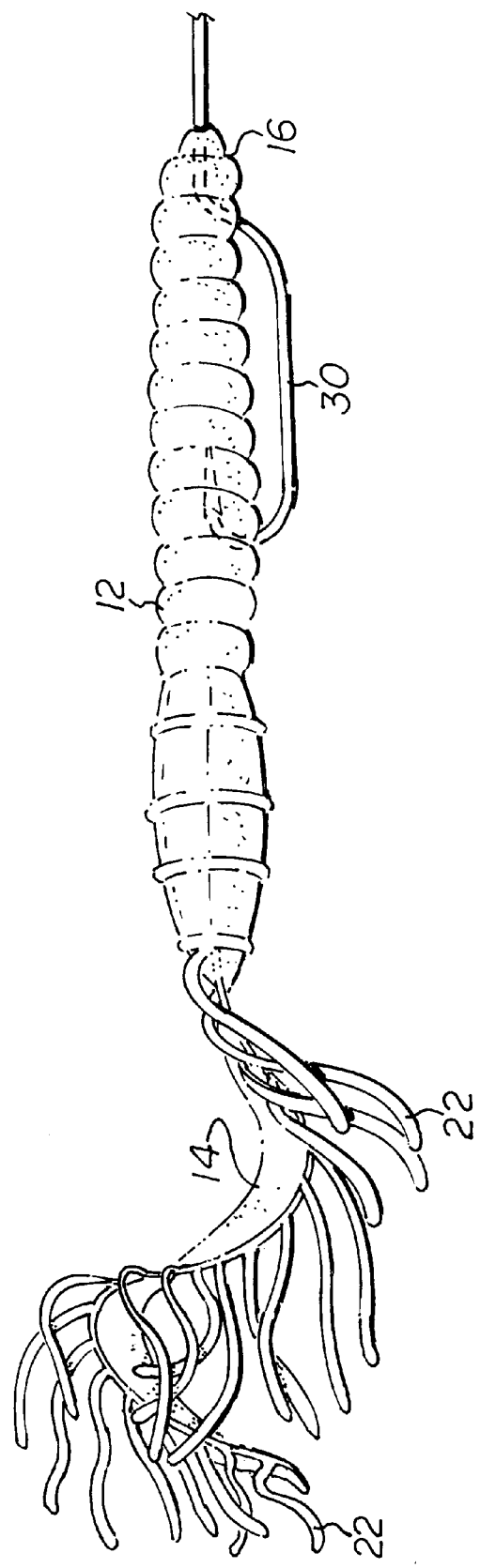
FIG. 2 is a side elevational view illustrating the appearance of our tassel tail lure at such time as it has been mounted on a hook and pulled through the water, with the force of the water causing the tail to move rearwardly out of its initially curved configuration, with the tassels streaming rearwardly and enhancing the attractiveness of the lure to a fish.

A hook-receiving portion 16 is located at the forwardmost part of the body portion 12, so that when a hook attached to a line has been inserted into the hook-receiving portion 16, such as revealed in FIG. 2, and the lure thereafter pulled through the water, the elongate, flexible, relatively thin tail 14 ripples in a very realistic manner, essentially duplicating the swimming motion of a worm, eel, snake, lizard or other such creature.

It will be noted from FIG. 1 that we have constructed the body portion 12 to be made up of alternating large sections and somewhat smaller sections, with this being done to increase flexibility and to heighten the similarity to the appearance of an actual worm. The tail 14 will be noted to have a pair of long edges, including a curved outer peripheral edge 20 as well as an inner curved edge 26.

It is also to be noted in FIG. 1 that the curved outer peripheral edge 20 of the tail 14 is equipped with a relatively large number of tassels 22, disposed in an essentially evenly spaced relationship. In the molding of the lure, each of the tassels 22 initially extends substantially perpendicularly outwardly from the curved outer peripheral edge 20. As a matter of possible interest, we prefer to use upper and lower mold halves containing suitable cavities utilized for simultaneously creating a number of lures in accordance with this invention. As is obvious, the upper mold half is brought into an aligned relationship with the lower mold half, following which hot plastic is inserted into the aligned mold halves. As a result, the various aligned cavity portions will receive the hot plastic and bring about the creation of individual lures in accordance with this invention. It is typical for lures to be made in groups of 18 to 20, but this fact forms no part of this invention.

Figure 3:
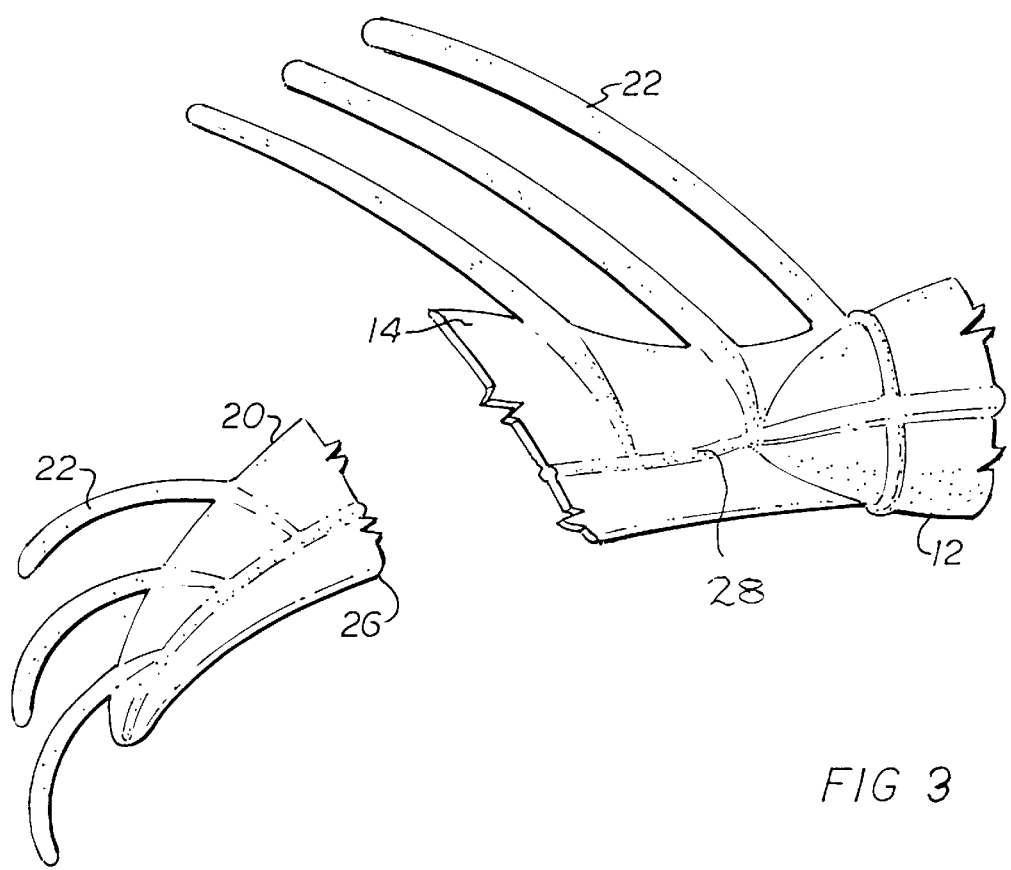
FIG. 3 is a view to a larger scale, with this fragmentary view depicting the longer tassels located near the end of the body of the lure, with the size of such tassels to be contrasted with the length of the tassels near the tail of the lure.

Instead of the inner end of each tassel 22 being affixed only to the very edge of the curved outer peripheral edge 20, we prefer for the inner end of each tassel to in effect continue through the relatively thin tail portion, and to be attached to what may be regarded as a spine member 28 extending for essentially the entire length of the tail; note FIG. 3.

It is to be understood that the tail 14 is flat and rippleless when the worm is residing in the substantially curved configuration depicted in FIG. 1. In contrast with this, it is important to note that upon the worm being mounted on a hook and moved through the water, the water resistance straightens the worm body and the tail to a considerable extent; note FIG. 2. This forces the curved outer peripheral edge 20 of the relatively thin tail 14 to undertake what may be regarded as a significant amount of wrinkling, or more appropriate to the context of this invention, a substantial amount of a highly desirable rippling. We have found that the relatively thin tail has little strength to resist the force of the water and therefore it ripples in a highly desirable and effective manner. In this regard our novel lure resembles the Wilson U.S. Pat. No. 6,170,190 entitled "Ribbon Fin Lure," which has a thin fin that is essentially flat when the lure is in its curved configuration, but which fin undertakes a rippled configuration when the lure is put into use and pulled through the water.

With particular reference to FIG. 2, in this figure we have revealed the appearance of our novel lure when viewed from directly above, with it to be noted that as a result of a hook 30 being inserted into the hook-receiving portion 16 and the lure being pulled through the water, the tail portion 14 is caused to move out of the initial curved configuration in which it is created, and into the fully operative position shown in this figure. It will be observed that the tassels 22 utilized on the tail of the lure move into rearwardly extending positions due to this motion of the lure through the water, with the tassels causing an enhancement of the swimming motion of the tail. We create the tassels to have sufficient stiffness to tend to extend out from the curved outer peripheral edge 20, but at the same time the tassels are flexible enough so as to be able to readily conform to the flow of the water over the lure, in the manner shown in FIG. 2.

Although the tassels could all be the same length, in the preferred instance depicted in FIGS. 1 and 3, we utilize tassels of graduated length, with longer tassels utilized on the part of the tail adjacent the body portion, with the tassels becoming shorter as the end of the tail is approached.

As will be apparent to one skilled in the art, the straightening out of the relatively thin tail 14 causes the arcuate contour of the outer peripheral edge 20 of the tail to be compacted, with the inner curved edge 26 of the tail tending to elongate, with this causing the tail 14 to undertake a significant and highly desirable amount of rippling, as depicted in FIG. 2.

Although the tassels of our lure are not to be limited to any particular dimension, in one exemplary embodiment, each tassel at the location of the curved outer peripheral edge 20 was 0.080" wide, with the thickness or depth of the tassel at this location being 0.070". This is as a result of the bottom half of the mold and the top half of the mold each having a depth of 0.035", thus to achieve the tassel thickness of 0.070".

Each tassel tapers essentially uniformly along its length to the tip, with the tip width typically being 0.042". With regard to the tip of a tassel, the bottom half of the mold and the top half of the mold each have a depth of 0.010", thus to achieve the tassel tip thickness of 0.020". This gives each tassel some substance, but allows each tassel to flow in the water behind the swimming tail. The extra depth at the end of the tassel remote from the tip of the tassel gives ample substance to help make each tassel stand out and not fold down when being pulled through the water. The smaller size near the tip of each tassel lets the tassel move quite freely near its end.

Because the tassels in the vicinity of the tip are shorter, they do not inhibit an extensive amount of motion of the tip when the lure is in use.

In the exemplary embodiment, the lure was approximately 6" in length, with the tassel nearest the body of the lure being approximately 1.55" in length, whereas the tassel nearest the tip of the tail was 0.45" in length.

It is obvious that the foregoing dimensions are provided merely by way of example, and we are not to be limited except as required by the scope of the appended claims.

Because of the advantageous construction we utilize, the tassels on the one hand stand out when the lure is motionless on the bottom of the lake or other body of water, yet on the other hand being able to move as a consequence of very slight water movement. We have found that the tassels bring about vibration of the tail that is particularly attractive to fish.

Although we have primarily described and illustrated the lure body in the context of a worm, we are not to be limited to this, for our invention could be utilized in connection with the creation of other animals, such as eels, snakes, lizards and the like.

We claim:

1. An artificial fishing lure of resilient material, said lure having a body portion and a flexible, elongate tail, said body portion having an aft end, and said tail possessing a curved configuration, being attached to said aft end of said body portion, said tail being relatively thin and essentially flat when said tail is in a curved configuration, but undertaking undulating motion when said lure is moved through the water and said tail is caused to move into a relatively straight configuration, said tail having at least one long edge, with a plurality of tassels affixed along said long edge, said tassels being relatively flexible and adapted to move with said tail at the time said tail undertakes undulating motion, said tassels causing said tail to give off vibrations attractive to fish.

2. The artificial fishing lure of resilient material as recited in claim 1 in which said tassels are affixed along the long edge representing the curved outer peripheral edge of said tail.

3. The artificial fishing lure of resilient material as recited in claim 1 in which said tassels are of graduated length, with the tassels closer to said body portion being longer than the tassels farthest from said body portion.

4. The artificial fishing lure of resilient material as recited in claim 1 in which said tail is of flexible plastic, with the tassels being integral with the tail, and made of the same material as the tail.

5. The artificial fishing lure of resilient material as recited in claim 1 in which the body portion of said lure is in the configuration of a worm, with said body portion made up of alternating large and relatively small sections.

6. An artificial fishing lure of resilient material, said lure having a body portion and a flexible, elongate tail, said body portion having an aft end, and said tail possessing a curved configuration and attached to said aft end of said body portion, said tail being relatively thin and essentially flat when said tail is in a curved configuration, said tail being caused to move into a relatively straight configuration at such time as said lure is moved through the water, with said tail undertaking undulating motion when moving through the water, said tail having at least one long edge, with a plurality of tassels affixed in a spaced relationship along said long edge, said tassels being relatively flexible and adapted to move with said tail at the time said tail undertakes undulating motion.

7. The artificial fishing lure of resilient material as recited in claim 6 in which said tassels are affixed along the long edge representing the curved outer peripheral edge of said tail.

8. The artificial fishing lure of resilient material as recited in claim 6 in which said tassels are of graduated length, with the tassels closer to said body portion being longer than the tassels farthest from said body portion.

9. The artificial fishing lure of resilient material as recited in claim 6 in which said tail is of flexible plastic, with the tassels being integral with the tail, and made of the same material as the tail.

10. The artificial fishing lure of resilient material as recited in claim 6 in which said lure is a worm, with the body portion of said lure made up of alternating large and relatively small sections.

* * * * *